United States Patent
Chung et al.

(10) Patent No.: US 11,056,055 B2
(45) Date of Patent: Jul. 6, 2021

(54) DISPLAY DEVICE

(71) Applicant: LG Display Co., Ltd., Seoul (KR)

(72) Inventors: Moonsoo Chung, Paju-si (KR); Joohee Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/522,497

(22) Filed: Jul. 25, 2019

(65) Prior Publication Data

US 2020/0051499 A1 Feb. 13, 2020

(30) Foreign Application Priority Data

Aug. 7, 2018 (KR) .................. 10-2018-0091894

(51) Int. Cl.
*G09G 3/3233* (2016.01)
*G06F 3/041* (2006.01)
*G06F 3/042* (2006.01)
*G09G 3/3266* (2016.01)
(Continued)

(52) U.S. Cl.
CPC ......... *G09G 3/3233* (2013.01); *G09G 3/3266* (2013.01); *G09G 3/3275* (2013.01); *G09G 5/377* (2013.01); *G06F 3/042* (2013.01); *G06F 3/0412* (2013.01); *G09G 2300/0465* (2013.01); *G09G 2300/0809* (2013.01);
(Continued)

(58) Field of Classification Search
CPC ........ G06F 3/0412; G06F 3/042; G06F 3/006; G06F 3/3233; G06F 3/3266; G06F 3/3275; G06F 3/3291; G06F 5/377; G09G 2300/0465; G09G 2300/0809; G09G 2310/027; G09G 2310/08; G09G 2320/0295; G09G 2320/043; G09G 2360/14; G09G 2360/144
See application file for complete search history.

(56) References Cited

U.S. PATENT DOCUMENTS

| 8,497,827 B2* | 7/2013 | Lee ................. G09G 3/3233 345/82 |
| 10,565,940 B2* | 2/2020 | Lee ................. G09G 3/3406 |
| 10,860,134 B2* | 12/2020 | Chung ............. G06F 3/042 |

(Continued)

FOREIGN PATENT DOCUMENTS

| CN | 106 406 622 A | 2/2017 |
| CN | 107 134 259 A | 9/2017 |

(Continued)

OTHER PUBLICATIONS

European Search report dated Sep. 27, 2019 issued in a related European patent application No. 19189299.1 (12 pages).

(Continued)

*Primary Examiner* — Mihir K Rayan
(74) *Attorney, Agent, or Firm* — Polsinelli PC (57) ABSTRACT

The display device according to the present disclosure may comprise a display panel equipped with a plurality of pixels and a plurality of photo sensors, a data driving circuit, a gate driving circuit, and a timing controller. The source drive IC included in the data driving circuit may comprise a DAC, one or more sensing units to receive an electrical signal from the photo sensor in a display period and to receive a sensing signal from the pixel in a blank period, and an ADC to convert the signal output from the sensing unit into digital data.

18 Claims, 8 Drawing Sheets

(51) Int. Cl.
*G09G 3/3275* (2016.01)
*G09G 5/377* (2006.01)
(52) U.S. Cl.
CPC ... *G09G 2310/027* (2013.01); *G09G 2310/08* (2013.01); *G09G 2360/14* (2013.01)

(56) References Cited

U.S. PATENT DOCUMENTS

| | | | | |
|---|---|---|---|---|
| 2003/0076295 | A1* | 4/2003 | Nakajima | G06F 3/03545 345/156 |
| 2004/0135749 | A1* | 7/2004 | Kondakov | G09G 3/3208 345/82 |
| 2007/0182723 | A1* | 8/2007 | Imai | G06F 3/0412 345/175 |
| 2010/0289829 | A1* | 11/2010 | Yamamoto | G09G 3/3233 345/690 |
| 2014/0152633 | A1 | 6/2014 | Park et al. | |
| 2015/0170578 | A1* | 6/2015 | Choi | G09G 3/3266 345/212 |
| 2015/0187271 | A1* | 7/2015 | Bae | H01L 27/14612 345/690 |
| 2015/0243217 | A1 | 8/2015 | Park et al. | |
| 2016/0098961 | A1* | 4/2016 | Han | G09G 3/3291 345/691 |
| 2016/0125811 | A1* | 5/2016 | Park | G09G 3/3258 345/694 |
| 2016/0189615 | A1* | 6/2016 | Kwon | G09G 3/3233 345/214 |
| 2017/0031485 | A1 | 2/2017 | Kim et al. | |
| 2019/0004650 | A1 | 1/2019 | Ma | |

FOREIGN PATENT DOCUMENTS

| | | |
|---|---|---|
| JP | 2018-072827 A | 5/2018 |
| KR | 10-2017-0106425 A | 9/2017 |

OTHER PUBLICATIONS

Japanese Office Action dated Sep. 29, 2020 issued in Patent Application No. 2019-142662 w/English Translation (8 pages).
Office Action dated Dec. 16, 2020 issued in European Patent Application No. 19 189 299.1 (7 pages).

* cited by examiner

DISPLAY DEVICE

CROSS-REFERENCE TO RELATED APPLICATION

This application claims the benefit of Korea Patent Application No. 10-2018-0091894 filed on Aug. 7, 2018, which are incorporated herein by reference in its entirety.

BACKGROUND

Field of the Disclosure

The present disclosure relates to a display device, and more particularly to a display device that drives the compensating circuit for a light emitting diode and the detecting circuit for a photo sensor in an integrated manner.

Description of the Background

An active matrix type organic light emitting display covers an organic light emitting diode (hereinafter, referred to as "OLED") which emits light by itself, and has advantages of a fast response speed, high light emitting efficiency, high brightness, and a wide viewing angle.

In an OLED display, pixels including the OLED are arranged in a matrix form, and a driving thin film transistor TFT adjusts a current flowing through the OLED according to a voltage applied between a gate electrode and a source electrode, thereby adjusting a luminance. The electrical characteristics of the OLED and the driving TFT deteriorate with time and may be different for respective pixels. An external compensation method is known for measuring sensing information corresponding to the electrical characteristics of pixels (a threshold voltage and mobility of the driving TFT and a threshold voltage of the OLED) and converting the sensing information into digital sensing data through an analog-to-digital converter ADC, and modulating image data based on the digital sensing data.

Recently, there has been an attempt to incorporate a photo sensor into a display panel and use it as an input device such as a touch input or a fingerprint sensor. The photo sensor is a device that stores the charge amount corresponding to a light intensity as information and outputs the stored information according to the control signal. In order to use the signal output from the photo sensor as an input signal, the output of the photo sensor must be converted into digital data through an ADC.

In order to add an input device such as a photo sensor to a display device that measures and compensates for electrical characteristics of pixels with an external compensation circuit, a source drive IC including the external compensation circuit and a reception drive IC for detecting the output of the photo sensor must be separately provided and operated separately. In addition, since the source driver IC and the reception drive IC are required to be equipped with an ADC for each pixel in a horizontal direction or each unit grouping several pixels, resource cannot used effectively.

SUMMARY

The present disclosure has been made in view of the above circumstances. The present disclosure is directed to provide a display device that drives the external compensation circuit and the photo sensor detection circuit in an integrated manner.

The present disclosure is directed to provide a method of integrally driving a sensing line for outputting electrical characteristics of a pixel and an output line of a photo sensor.

The display device according to an aspect of the present disclosure may comprise: a display panel equipped with a plurality of pixels emitting light according to an image signal and a plurality of photo sensor outputting an electrical signal responding to incident light; a data driving circuit comprising one or more source drive IC configured to supply the image signal to the pixel, receive a sensing signal indicating characteristics of the pixel, and to receive the electrical signal from the photo sensor; a gate driving circuit configured to generate scan signals to control operations of the pixels and the photo sensors; and a timing controller configured to supply control signals to control operations of the data driving circuit and the gate driving circuit and image data to be displayed. The source drive IC may comprise: a digital-to-analog converter DAC configured to convert the image data supplied from the timing controller into the image signal; one or more sensing units configured to receive the electrical signal from the photo sensor in a display period during which the image signal is supplied to the pixel and to receive the sensing signal from the pixel in a blank period between two display periods; and an analog-to-digital converter ADC configured to convert a signal output from the sensing unit into digital data.

In an aspect, the pixel may comprise: a light emitting diode emitting light according to an applied current; a driving TFT controlling an amount of the current applied to the light emitting diode according to a voltage difference between gate and source electrodes; a first switch TFT supplying the image signal supplied by the data driving circuit to the gate electrode of the driving TFT responding to the scan signal; a second switch TFT controlling a connection to the sensing unit responding to the scan signal; and a storage capacitor for storing a data voltage corresponding to the image signal supplied to the driving TFT.

In an aspect, the pixel may be connected to the sensing unit through a sensing line, and the photo sensor may be connected to the sensing unit through a photo line.

In an aspect, the sensing unit may comprise: a fifth switch TFT controlling whether to supply a reference voltage to the pixel through the sensing line; a sixth switch TFT controlling a connection between the sensing line and the ADC; a seventh switch TFT controlling a connection between the photo line and the ADC; and a buffer amplifying the electrical signal input through the photo line and transferring the amplified electrical signal to the ADC.

In an aspect, the fifth and seventh switch TFTs may be turned on in the display period, and the sixth switch TFT may be turned on in the blank period.

In an aspect, the pixel and the photo sensor may be connected to the sensing unit through a sensing line, and the pixel may further comprise a switch TFT for controlling a timing of supplying a reference voltage.

In an aspect, the sensing unit may comprise: eighth and ninth switch TFTs connecting the ADC to the sensing line according to a same control signal in the blank period; a sensing unit capacitor disposed between the eighth and ninth switch TFTs and storing a voltage corresponding to the sensing signal; a tenth switch TFT connecting the sensing unit to the ADC in the display period; and a buffer amplifying the electrical signal input through the sensing line in the display period and transferring the amplified electrical signal to the ADC.

In an aspect, the pixel and the sensing unit may be connected through a sensing line, and the gate driving circuit may be configured to supply a sense signal of a turn-on level to a first pixel to which the data driving circuit supplies the image signal in order to connect the first pixel to the sensing line in the display period, and to supply the sense signal of the turn-on level to a second pixel to which the data driving circuit supplies image signal for sensing in order to connect the second pixel to the sensing line in the in the blank period.

In an aspect, the photo sensor may comprise: a photo TFT outputting a current corresponding to incident light; a photo capacitor charging the current output by the photo TFT; and a third switch TFT controlling a connection between the photo capacitor and the sensing unit according to the scan signal.

In an aspect, the photo TFT and the third switch TFT may be turned on by two scan signals apart from each other by at least 1 horizontal period.

In an aspect, the third switch TFT of the photo sensor may be controlled by a first scan signal, the first scan signal being supplied to a pixel corresponding to the photo sensor so as to supply the image signal to the corresponding pixel, and the photo TFT of the photo sensor may be controlled by a second scan signal that is at least two horizontal periods later than the first scan signal.

In an aspect, the photo sensor may output, to the sensing unit, the electrical signal corresponding to light which a pixel corresponding to the photo sensor emits according to the image signal, and the ADC converts the electrical signal into digital photo data.

In an aspect, the timing controller may be configured to manage a look-up table storing correlation between the image data and luminance which the pixel emits, compare the digital photo data transferred from the data driving circuit with corresponding data in the look-up table, and compensate for image data to be displayed on the display panel according to comparison results.

In an aspect, the ADC converts the electrical signal output by the photo sensor into digital photo data and output it. And, the timing controller may be configured to compare the digital photo data transferred from the data driving circuit with a reference value, generate a coordinate of the photo sensor outputting the digital photo data exceeding the reference value, and transmit the coordinate to a connected host system.

In an aspect, the host system may be configured to generate an image expressing that there is an external input in the coordinate received from the timing controller, superimpose the generated image on the image data to be displayed on the display panel, and output the superimposed image data to the timing controller.

In an aspect, one photo sensor may be disposed for each pixel unit constituted by a plurality of pixels.

The method for driving a display device according to another aspect of the present disclosure may comprise: making a plurality of pixels included in a display panel emit light by writing image data to the pixels in a display period; and writing data for sensing pixels of a pixel line, receiving sensing signals indicating characteristics of the pixels from the pixels, and converting the sensing signals into digital sensing data in a blank period between two display periods. The step of making may further comprise: receiving electrical signals which a plurality of photo sensors included in the display panel output corresponding to incident light; and converting the electrical signals into digital photo data.

By combining the circuit for the external compensation and the circuit for the photo sensing, the driving circuit can be integrated, and the number of ADCs can be reduced, resulting in cost reduction.

Further, the size of the bezel can be reduced by integrating the driving circuit.

Further, by unifying the sensing line for the external compensation and the output line of the photo sensor, the aperture ratio of pixels can be increased.

In addition, since the photo sensor is employed in the display device, user commands can be input without touching.

Also, image data can be compensated based on an actual output luminance of the OLED using the output of the photo sensor.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION

Hereinafter, the aspects of the present disclosure will be described in detail with reference to the accompanying drawings. Same reference numerals throughout the specification denote substantially identical components. In the following description, a detailed description of known functions and configurations incorporated herein will be omitted when it may make the subject matter of the present disclosure rather unclear.

Figure 1:
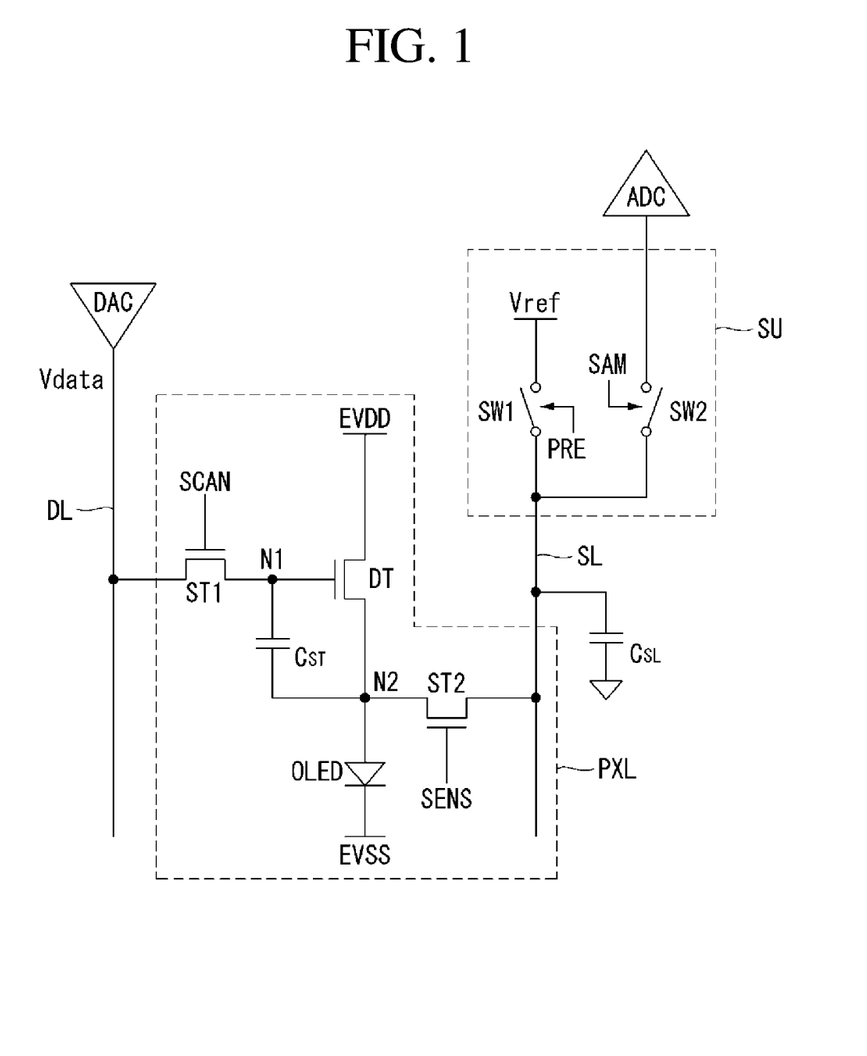
FIG. 1 illustrates the connection of a pixel circuit and an external compensation circuit of a voltage sensing type.

FIG. 1 illustrates the connection of a pixel circuit and an external compensation circuit of a voltage sensing type.

In FIG. 1, the pixel circuit PXL is arranged in a display panel, and the digital-analog converter DAC, the sensing unit SU and the analog-digital converter ADC are embedded in a source drive IC.

The DAC converts the digital data output from the source drive IC into the data voltage Vdata for image display and supplies it to the pixel circuit PXL through a data line DL.

The sensing unit senses the sensing voltage stored in the line capacitor $C_{SL}$ of the sensing line SL corresponding to the current flowing through the driving TFT DT included in the pixel circuit PXL. The sensing unit may comprise the first switch SW1 for controlling, according to an initializing control signal PRE, the connection between the sensing line SL and the reference voltage source providing a reference voltage Vref, and the second switch SW2 for controlling the connection, according to a sampling control signal SAM, the connection between the sensing line SL and the ADC. A sample&hold unit for sampling and holding an analog sensing voltage may be added between the second switch SW2 and the ADC during sense driving.

When the voltage of the source node N2 of the driving TFT DT varies according to the current Ids flowing through the driving TFT DT, the ADC converts the source node voltage of the driving TFT DT stored in the line capacitor $C_{SL}$ of the sensing line SL to a digital sensing value and outputs it at a specific point in time when the second switch SW2 is turned on.

The pixel or the pixel circuit PXL may comprise the driving TFT DT, a first switch TFT ST1, a second switch TFT ST2, a storage capacitor $C_{ST}$ and an OLED. The first switch TFT ST1 applies the data voltage Vdata supplied through the data line DL to the gate electrode of the driving TFT DT according to a scan signal SCAN. The second switch TFT ST2 applies the reference voltage Vref to the source electrode of the driving TFT DT according to a sense signal SENS. The driving TFT DT controls the current flowing through the OLED according to the voltage Vgs between gate and source electrodes.

In the external compensation method, after the driving TFT DT is operated in a source follower manner, the voltage of the source electrode of the driving TFT DT is inputted as the sensing voltage, and input digital video data is modulated based on the digital sensing value SD converted by the ADC in order to compensate for the change of the threshold voltage of the driving TFT DT. Such external compensating operation may be performed in at least one of the non-display periods because the time required for sensing is relatively long.

Figure 2:
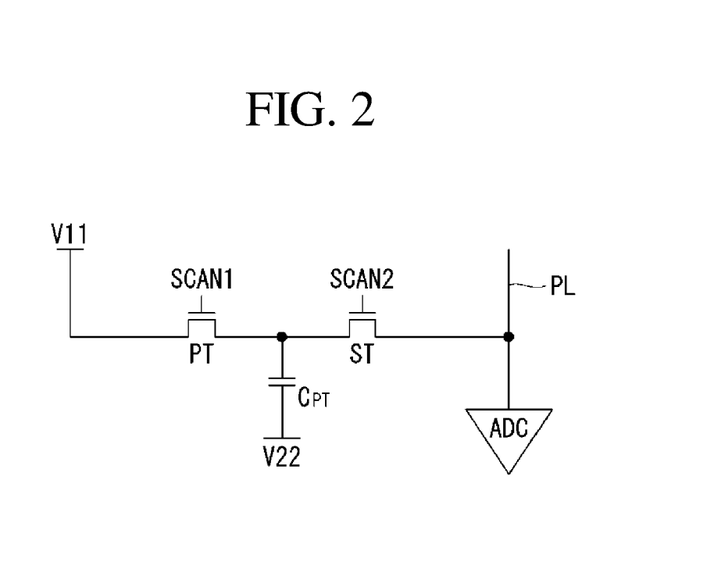
FIG. 2 shows a photo sensing circuit.

FIG. 2 shows a photo sensing circuit.

The photo sensing circuit or photo sensor may comprise a photo TFT PT, a photo capacitor $C_{PT}$, and a switch TFT ST. The photo TFT PT senses light input while a first scan signal SCAN1 is kept on to generate a current. The photo capacitor $C_{PT}$ charges the current generated from the photo TFT PT while the switch TFT ST maintains an off state. The switch TFT ST is turned on in accordance with a second scan signal SCAN2 to supply the voltage of the photo capacitor $C_{PT}$ to a photo line PL. The ADC converts the voltage transferred through the photo line PL into a digital value.

When an object such as a finger, a pen, or a pupil approaches or touches the photo sensor, the quantity of light incident on the photo sensor changes, and when the change in the light amount is received through the photo lines PL and processed, the approaching or touched object may be recognized. When a laser beam is incident on the photo sensor from a laser pointer, the photo sensor senses the laser beam and the position information on the incident position of the laser beam may be obtained. Therefore, the photo sensor may be embedded in a display panel and used as an input device such as touch recognition, fingerprint recognition, iris recognition, laser pointer recognition, and the like.

In order for the photo sensor to be built in the display panel and used as an input device for touch or pointer recognition, a photo sensor must be mounted for each pixel or each pixel group of a predetermined number of pixels (for example, n×m pixels), and a wiring for fetching the output of the photo sensor, that is a photo line is required.

Even if the photo sensors arranged in a vertical direction (for example a first direction) in which the data lines travel are bundled to share one photo line PL, the number of photo lines equal to the number of the horizontal resolution of the display panel in a horizontal direction (for example a second direction perpendicular to the first direction) in which the gate lines travel is required. Or the number of photo lines equal to the number obtained by dividing the horizontal resolution by n is required. Also, even if one ADC is connected to each photo line or a predetermined number of photo lines are connected one ADC, a large number of ADCs must be placed in the bezel area outside the display area of the display panel.

As shown in FIG. 1, the sensing unit and the ADC is mounted in a source drive IC which applies a data voltage to the display panel in order to perform the external compensation operation in the organic light emitting device.

In view of this point, by mounting an input device of a photo sensor on an organic light emitting display device and by using an ADC for external compensation together for an output of the photo sensor, the number of ADCs to convert the output of the photo sensor can be reduced and the bezel area can be prevented from becoming large.

Figure 3:
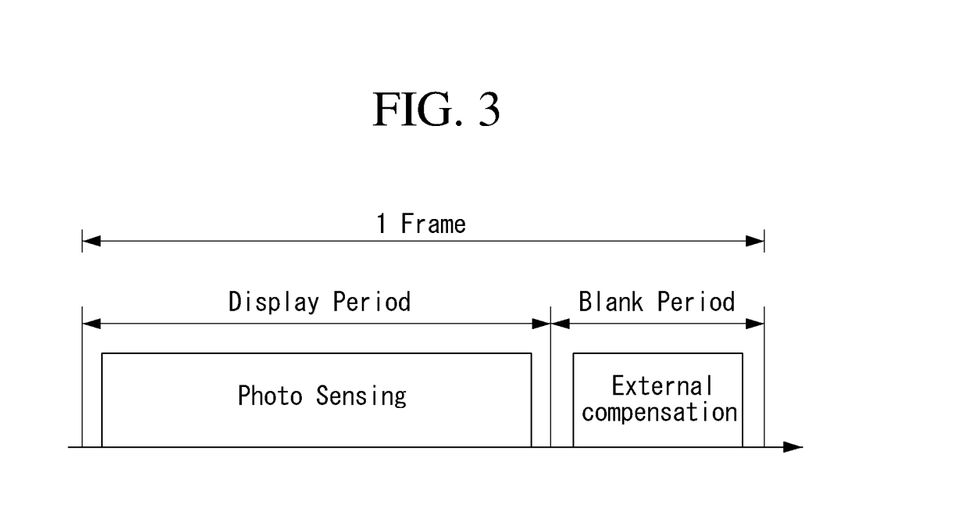
FIG. 3 conceptually illustrates the aspect of carrying out photo sensing in a display period and external compensation in a blank period according to an aspect of the present disclosure.

FIG. 3 conceptually illustrates the aspect of carrying out photo sensing in a display period and external compensation in a blank period according to an aspect of the present disclosure.

As explained referring to FIG. 1, the external compensation operation may be performed in a non-display period in one frame, for example in blank periods except for display periods in which data is written to a pixel and an OLED emits light. Since the ADC included in the source drive IC operates in the blank period, the ADC must convert the output of the photo sensor into a digital value in a period except for the blank period, which is the display period.

As shown in FIG. 3, among one frame, the display operation of emitting the pixel and the photo sensing operation of using the photo sensor may be performed in the display period, and the external compensation operation of sensing the characteristics of the pixel may be performed in the blank period.

Figure 4:
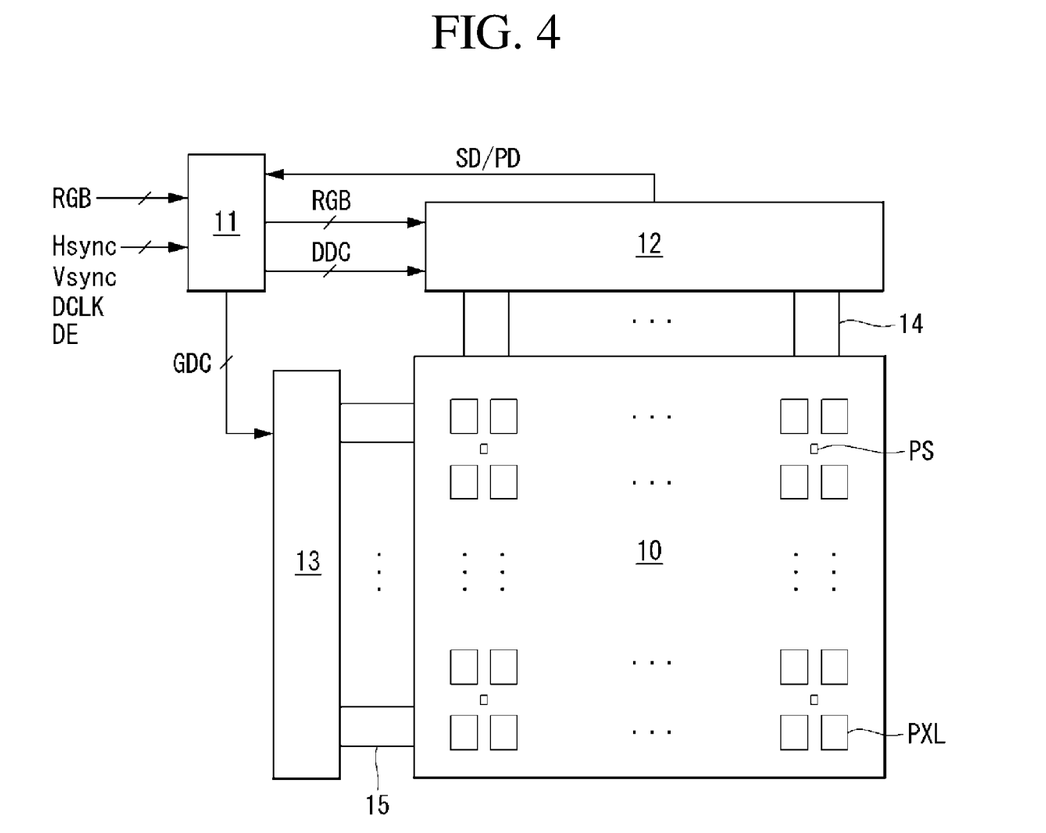
FIG. 4 shows a block diagram of an organic light emitting display device according to the present disclosure.

FIG. 4 shows a block diagram of an organic light emitting display device according to the present disclosure. The display device may comprise a display panel 10, a timing controller 11, a data driving circuit 12 and a gate driving circuit 13.

The display device of FIG. 4 may further comprise a power circuit for generating the voltages necessary for the operations of the data and gate driving circuits 12 and 13 using an external power source and for generating a high potential driving voltage and a low potential driving voltage and supplying them to the display panel 10. Also, the display device may further comprise a touch driving circuit for driving touch sensors.

In the display panel 10, a plurality of data lines 14, sensing lines 14, and photo lines 14 that extend in the vertical direction (first direction) and a plurality of gate lines 15 extending in the horizontal direction (second direction) cross each other. Pixels PXL are arranged in a matrix form for respective crossing regions where the data lines and the gate lines cross each other to form a pixel array.

The plurality of gate lines 15 may include a plurality of first gate lines to which scan signals SCAN for controlling the application of data voltages are supplied and a plurality of second gate lines to which sense signals SENS for controlling the connection of the pixel PXL and the sensing line are supplied. However, when the scan signal and the sense signal have a same phase, the first and second gate lines may be unified into one.

In the pixel array, each pixel PXL disposed in a same horizontal line is connected to one of the data lines 14, one of the sensing lines 14, one of the first gate lines, and one of the second gate lines to constitute a pixel line.

A plurality of pixels included in one pixel unit may share one sensing line 14. The pixel unit may be composed of three subpixels including a red subpixel, a green subpixel, and a blue subpixel or four subpixels including a red subpixel, a green subpixel, a blue subpixel, and a white subpixel, but is not limited thereto.

In the display panel 10, one photo sensor PS may be arranged for each pixel unit, or one photo sensor PS may be arranged for each pixel unit group composed of n pixel units in the horizontal direction and m pixel units in the vertical direction. Each photo sensor PS may be connected to one of the photo lines 14 travelling in the vertical direction and connected to one or two of the gate lines 15 (SCAN1 and SCAN2 in FIG. 2) travelling in the horizontal direction. Also, the photo sensor may be connected to voltage lines (V11 and V22 in FIG. 2). The photo sensor may comprise a photo TFT, a capacitor and switch TFT.

The pixel PXL may be electrically connected to the data line 14 according to the scan signal SCAN input through the first gate line to receive a data voltage. Also, the pixel PXL may receive the reference voltage Vref from or output a source voltage of the driving TFT DT to the sensing unit SU according to the sense signal SEN input through the second gate line. The pixels disposed on a same pixel line simultaneously operates according to the scan signal input through a same first gate line and the sense signal input through a same second gate line.

The pixel is supplied with a high potential driving voltage EVDD and a low potential driving voltage EVSS from a power generator and may comprise a light emitting element, a driving transistor, a storage capacitor, and a plurality of switching transistor. The light emitting element may be an inorganic electroluminescent device or an organic light emitting diode OLED device. Hereinafter, the OLED will be described as an example for convenience.

The pixel may further comprise an internal compensation circuit. The internal compensation circuit which comprises one or more switch TFTs and one or more capacitors initializes the gate electrode of the driving TFT, and then senses the threshold voltage and electron mobility of the driving TFT to compensate for the data voltage. Any known type of the internal compensation circuit is applicable to the present disclosure.

The TFTs constituting the pixel may be implemented as a p-type or an n-type of a Metal Oxide Semiconductor Field Effect Transistor (MOSFET) or as a hybrid type in which P-type and N-type are mixed. In addition, the semiconductor layer of the TFTs may include amorphous silicon, polysilicon, or an oxide. The following aspects are illustrated with the n-type transistor, but the present disclosure is not limited thereto.

A transistor is the element of 3 electrodes including a gate, a source and a drain. The source is an electrode for supplying a carrier to the transistor. Within the transistor the carrier begins to flow from the source. The drain is an electrode from which the carrier exits the transistor. That is, the flow of carriers in the MOSFET is from the source to the drain.

In the case of an N-type MOSFET (NMOS), since the carrier is an electron, the source voltage has a voltage lower than the drain voltage so that electrons can flow from the source to the drain. In the N-type MOSFET, a current direction is from the drain to the source because electrons flow from the source to the drain. In the case of a P-type MOSFET (PMOS), since the carrier is a hole, the source voltage is higher than the drain voltage so that holes can flow from the source to the drain. In the P-type MOSFET, a current flows from the source to the drain because holes flow from the source to the drain.

The source and drain of the MOSFET are not fixed. For example, the source and drain of the MOSFET may vary depending on the applied voltage. In the following aspects, the disclosure should not be limited due to the source and drain of the transistor, and the source and drain electrodes may be referred to as first and second electrodes without distinguishing between the source and the drain electrodes.

Touch sensors may be arranged in the display panel 10. Touch input may be sensed using separate touch sensors or may be sensed through pixels. The touch sensors may be disposed on the display panel 10 in an on-cell type or an add-on type, or implemented as in-cell type touch sensors embedded in the pixel array.

The timing controller 11 supplies image data RGB transmitted from an external host system (not shown) to the data driving circuit 12. The timing controller 11 receives, from the host system, timing signals, such as a vertical synchronization signal Vsync, a horizontal synchronization signal Hsync, a dot clock signal DCLK, and a data enable signal DE and generates control signals for controlling the operation timings of the data driving circuit 12 and the gate driving circuit 13, based on the timing signals. The control signals may include the gate timing control signal GDC for controlling the operation timings of the gate driving circuit 13 and the data timing control signal DDC for controlling the operation timings of the data driving circuit 12.

The timing controller 11 may temporally separate the sense driving (or external compensation driving) for sensing the driving characteristics of pixels and updating compensation values, and the display driving for displaying the image on which the compensation values are reflected, according to a predetermined control sequence.

Under the control of the timing controller 11, the external compensation driving may be performed at a vertical blank period between display periods, or during a power-on sequence period before the display operation starts, or during a power-off sequence period after the display operation ends.

The vertical blank period is a period during which input image data DATA is not written and disposed between vertical active periods during which input image data of 1 frame is written. The power-on sequence period means a transient period from when the system power is turned on until the input image is displayed. The power-off sequence period means a transient period from the end of the display of the input image until the system power is turned off.

The external compensation driving of the characteristics sensing and the updating may be performed in a state where only the screen of the display device is turned off while the system power is being applied, for example, in a standby mode, a sleep mode, a low power mode, and the like. The timing controller 11 may detect the standby mode, the sleep mode, the low power mode, and the like according to a predetermined detecting process and control all operations for the external compensation driving.

The timing controller 11 receives the digital sensing data SD according to the external compensation driving from the data driving circuit 12, compensates for input digital video data RGB based on the digital sensing data SD and supplies the compensated data to the data driving circuit 12, thereby compensating for the electrical characteristics of the driving TFT or the deterioration of the OLED.

Figure 5:
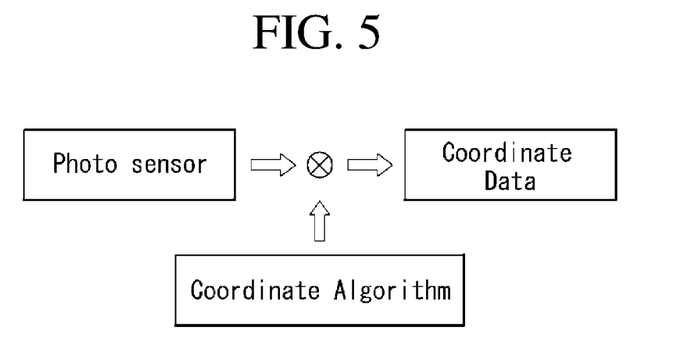
FIG. 5 conceptually shows the aspect of obtaining coordinate data by applying a coordinate algorithm to the output data of a photo sensor.

FIG. 5 conceptually shows the aspect of obtaining coordinate data by applying a coordinate algorithm to the output data of a photo sensor.

The timing controller 11 may perform a photo sense driving for detecting an output signal of the photo sensor as a touch or pointer input signal during a display period of performing the display driving. The timing controller 11 may receive the digital photo data PD according to the photo sense driving from the data driving circuit 12, generate the coordinate data corresponding to the input through the photo sensor by applying a predetermined coordinate algorithm to the digital photo data PD, and transmit the coordinate data to the host system, so that the coordinate data can be used as a touch input or a pointer input.

That is, the timing controller 11 may compare the input digital photo data PD with a reference value, determine that there is a touch or a pointer input in the photo sensor that outputs the digital photo data PD exceeding the reference value, and calculate the coordinate of the corresponding photo sensor. When the digital photo data PD output from a plurality of photo sensors constituting one cluster is larger than the reference value, the timing controller 11 may more clearly judge that there is a touch or a pointer input in the corresponding area and calculate the center coordinate of the corresponding area.

When the host system receives the coordinate information corresponding to the digital photo data PD from the timing controller 11, the host system may perform an operation corresponding to the touch generated in the coordinate, or generate an image (for example, a circle of a red color having a predetermined size) expressing that there is a touch or a pointer input in the coordinate, superimpose the generated image on the image data to be displayed on the display panel 10 and output the superimposed image data to the timing controller 11.

The data driving circuit 12 converts the digital video data RGB input from the timing controller 11 into an analog data voltage under the control of the timing controller 11 and outputs it to the data lines 14. The data voltage may be a value corresponding to an image signal to be represented by an organic light emitting element.

The data driving circuit 12 senses, in the sensing line, the voltage corresponding to the driving characteristics of the pixel via the sensing unit SU according to the data control signal DDC, during the blank period in which the external compensation driving is performed, converts the sensed voltage into digital sensing data SD through the ADC and outputs it to the timing controller 11.

And, the data driving circuit 12 senses, in the photo line, the voltage corresponding to the output of the photo sensor PS via the sensing unit SU according to the data control signal DDC, during the display period in which the display driving is performed, converts the sensed voltage into digital photo data PD through the ADC and outputs it to the timing controller 11.

The gate driving circuit 13 generates scan signals and sense signals based on the gate control signal GDC under the control of the timing controller 11. The gate driving circuit 13 may generate the scan signals and the sense signals in a row sequential manner and sequentially provide the scan signals and the sense signals to the first and second gate lines connected to respective pixel lines.

The gate drive circuit 13 may be composed of a plurality of gate drive integrated circuits each of which includes a shifter register, a level shifter for converting the output signal of the shift register into the signal having the swing magnitude suitable for driving the TFTs in the pixel, and an output buffer. Alternatively, the gate driving circuit 13 may be formed directly on the lower substrate of the display panel 10 using a GIP (gate drive IC in panel) method. In the case of the GIP method, the level shifter may be mounted on a PCB, and the shift register may be formed on the lower substrate of the display panel 10.

In a mobile device or a wearable device, the driving circuits such as the data driving circuit 12, the gate driving circuit 13, a touch driving circuit, the timing controller 11, and a power supply circuit may be integrated into one integrated circuit.

Figure 6:
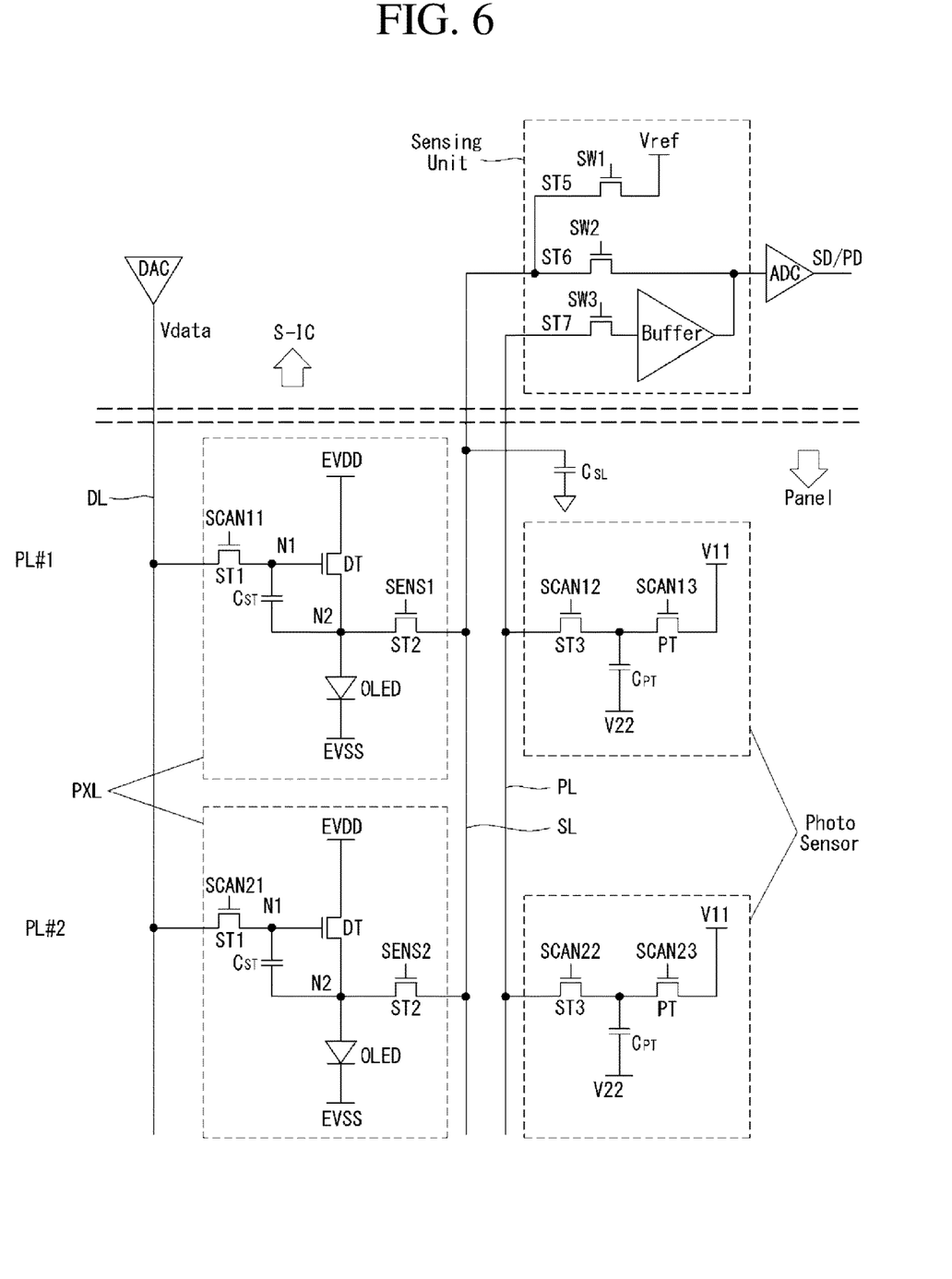
FIG. 6 illustrates that pixel circuits and photo sensing circuits mounted on a display panel are connected to a sensing unit incorporated in a source drive IC according to an aspect of the present disclosure.

FIG. 6 illustrates that pixel circuits and photo sensing circuits mounted on a display panel are connected to a sensing unit incorporated in a source drive IC according to an aspect of the present disclosure. In FIG. 6, pixels and photo sensors are disposed in each of two successive pixel lines PL #1 and PL #2 in the display panel.

The pixel PXL may include a light emitting diode, a driving TFT DT, a storage capacitor CST, a first switch TFT ST1, and a second switch TFT ST2.

The light emitting diode, for example an OLED includes an anode electrode connected to a second node N2, an cathode electrode connected to the input terminal of a low potential driving voltage EVSS and organic compound layers located between the anode electrode and the cathode electrode The driving TFT DT controls the amount of the current input to the OLED according to the voltage Vgs between a gate electrode and a source electrode. The gate electrode of the driving TFT DT is connected to a first node N1, the drain electrode of the driving TFT DT is connected to the input terminal of the high potential driving voltage EVDD, and the source electrode of the driving TFT DT is connected to the second node N2.

The storage capacitor $C_{ST}$ is connected between the first node N1 and the second node N2.

The first switch TFT ST1 applies a data voltage Vdata of the data line DL to the first node N1 in response to the scan signal SCAN11 or SCAN21. The gate electrode of the first switch TFT ST1 is connected to the first gate line 15 outputting the scan signal SCAN11, the first electrode of the first switch TFT ST1 is connected to the data line 14 and the second electrode of the first switch TFT ST1 is connected to the first node N1.

The second switch TFT ST2 controls the connection between the second node N2 and the sensing line SL in response to the sense signal SENS1 or SENS2. The gate electrode of the second switch TFT ST2 is connected to the second gate line 15, the first electrode of the second switch TFT ST2 is connected to the sensing line SL and the second electrode of the second switch TFT ST2 is connected to the second node N2.

The photo sensor may comprise a photo TFT PT, a third switch TFT ST3 and a photo capacitor $C_{PT}$.

The photo TFT PT converts the light energy incident on a photo semiconductor layer into electrical energy. In the photo TFT PT, a gate electrode is connected to one of the first gate lines 15, a first electrode is connected to the input terminal of a first voltage V11, and a second electrode is connected to the first electrode of the photo capacitor $C_{PT}$.

The photo capacitor $C_{PT}$ for charging the current generated in the photo TFT PT has the first electrode connected to the second electrode of the photo TFT PT and a second electrode connected to the input terminal of a second voltage V22.

The third switch TFT ST3 controls the connection between the photo capacitor $C_{PT}$ and the photo line PL. In the third switch TFT ST3, a gate electrode is connected to the other one of the first gate lines 15, a first electrode is connected to the first electrode of the photo capacitor $C_{PT}$, and a second electrode is connected to the photo line PL.

The photo TFT PT and the third switch TFT ST3 may use one of the scan signals output from the gate driving circuit 13, and it is possible to use a scan signal supplied to a same pixel line or a scan signal supplied to another pixel line.

A source drive IC S-IC may include a DAC, a sensing unit, and an ADC.

The DAC connected to the data line DL converts the input image data DATA applied from the timing controller 11 to a data voltage for displaying Vdata in accordance with the data control signal DDC and supplies it to the data line DL, when the display driving is performed. The data voltage for displaying Vdata is a voltage that varies depending on the grayscale of the input image.

The DAC generates a data voltage for sensing according to the data control signal DDC and supplies it to the data lines DL, when the external compensation driving is performed. The data voltage for sensing is a voltage that can turn on the driving TFT DT provided in the pixel PXL in the external compensation driving. The data voltage for sensing may be generated with a same value for all the pixels or may be generated with different values for each color in consideration of the pixel characteristics being different for each color.

The sensing unit may supply the reference voltage Vref to the sensing line SL, or sample and hold the voltage (the electrical characteristic value for the OLED or the driving TFT) of the second node N2 of the pixel PLX and supply it to the ADC, according to the data control signal DDC, at the time of external compensation driving. The voltage of the second node N2 is stored in the capacitor $C_{SL}$ of the sensing line. The sensing unit may be implemented as a current sensing type or a voltage sensing type, and FIG. 6 shows the voltage sensing type.

Also, the sensing unit may amplify a current flowing through the photo line PL (the photo sensor converts incident light into charges, the charges are stored in the photo capacitor $C_{PT}$, the charges in the photo capacitor $C_{PT}$ makes a current flow through the photo line PL) to supply it to the ADC, at the time of the display driving.

The sensing unit may include a fifth switch TFT ST5, a sixth switch TFT ST6, a seventh switch TFT ST7, and a buffer.

The fifth switch TFT ST5 controls the supply of the reference voltage Vref to the pixel. In the fifth switch TFT ST5, a gate electrode receives a first switching signal SW1, first electrode is connected to the input terminal of the reference voltage Vref, and a second electrode is connected to the sensing line SL.

The sixth switch TFT ST6 controls the connection between the sensing line SL and the ADC. In the sixth switch TFT ST6, a gate electrode receives a second switching signal SW2, a first electrode is connected to the sensing line SL, and a second electrode is connected to the ADC.

The seventh switch TFT ST7 controls the connection between the photo line PL and the buffer. In the seventh switch TFT ST7, a gate electrode receives a third switching signal SW3, a first electrode is connected to the photo line PL, and the second electrode is connected to the buffer.

The buffer integrates and amplifies the output current of the photo sensor input through the photo line PL by a feedback capacitor (not shown) to a voltage, and transmits the amplified voltage to the ADC.

The ADC converts the voltage output from the sensing unit into digital data, and a plurality of sensing units may be sequentially connected to one ADC. So, the ADC may sequentially receive photo sensing signals from the plurality of photo lines PL and convert the photo sensing signals into digital photo data PD in the display period, and sequentially receive the voltage of the second node N2 from the plurality of sensing lines SL and convert the voltage into digital sensing data SD in the blank period.

Figure 7:
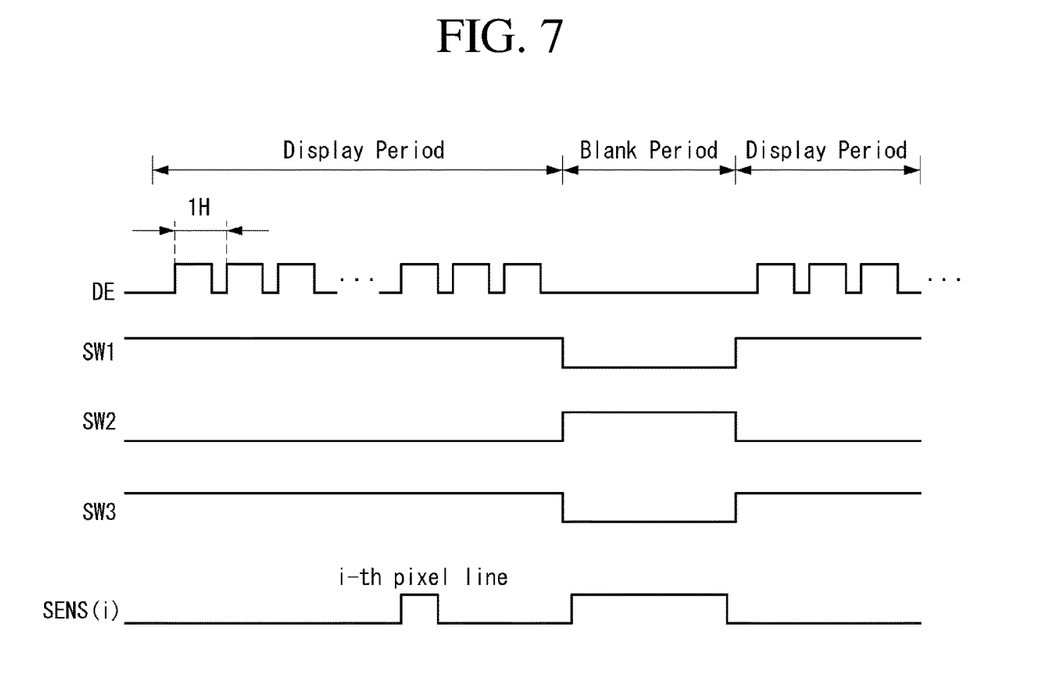
FIG. 7 shows operation timings of the switches constituting the sensing unit of FIG. 6.
Figure 8:
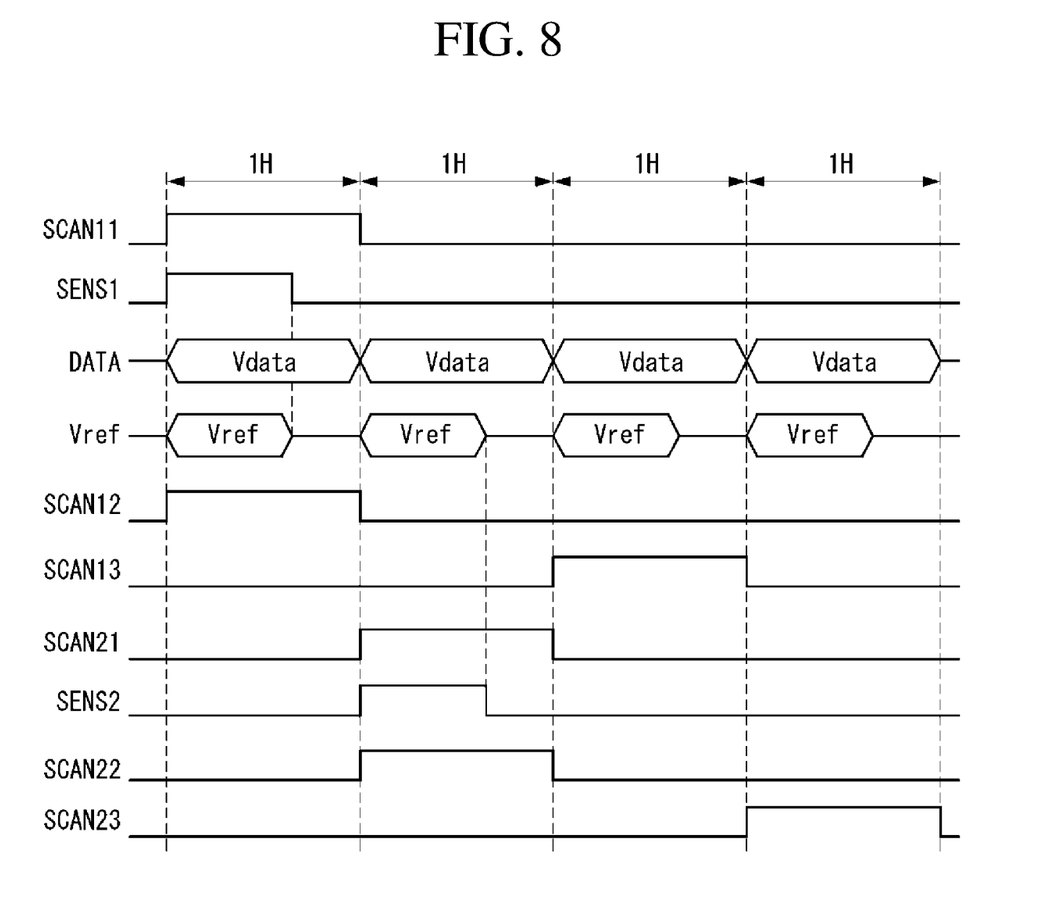
FIG. 8 shows operation timings of the switches constituting the pixel circuit and the photo sensing circuit of FIG. 6.

FIG. 7 shows operation timings of the switches constituting the sensing unit of FIG. 6, and FIG. 8 shows operation timings of the switches constituting the pixel circuit and the photo sensing circuit of FIG. 6.

One frame is driven by being divided into a display period (vertical active period) for performing the display driving of displaying image data on the display panel 10 and the photo sense driving of detecting the voltage accumulated in the photo sensor, and a blank period for performing the external compensation driving.

In FIG. 7, in the blank period, the fifth switch TFT ST5 does not supply the reference voltage Vref to the sensing line SL in accordance with the first switching signal SW1 of a turn-off level, the sixth switch TFT ST6 connects the sensing line SL to the ADC according to the second switching signal SW2 of a turn-on level, and the seventh switch TFT ST7 disconnects the photo line PL from the buffer in accordance with the third switching signal SW3 of the turn-off level.

Also, in the blank period, the sense signal SENS(i) of the turn-on level is applied to the second gate line 15 of the pixel line (i-th pixel line in FIG. 7) to be subjected to the external compensation driving, so the pixels of the corresponding pixel line is connected to the sensing line SL.

The display device performs the external compensation operation that senses driving characteristics of the pixel in the blank period. That is, in the blank period, the data driving circuit 12 applies the data voltage for sensing to all the subpixels or some subpixels belonging to the i-th pixel line through the data line 14 or DL and the gate driving circuit 13 applies a scan pulse to the first gate line 15 of the i-th pixel line to turn on the first switch TFT ST1, so the data voltage for sensing in the data line is applied to the gate electrode of the driving TFT DT. Then, the driving TFT DT is turned on to flow a current through the driving TFT DT and a voltage corresponding to the difference between the data voltage for sensing and the threshold voltage of the driving TFT DT is formed in the second node N2. And, the sensing unit senses the voltage of the second node N2 through the second switch TFT ST2, the sensing line SL and the sixth switch TFT ST6 and the ADC converts the voltage to the digital sensing data SD.

Data voltages are sequentially applied to all the pixel lines in accordance with the data enable signals DE of one horizontal period 1H in the display period. In FIG. 7, in the display period, the fifth switch TFT ST5 applies the reference voltage Vref to the sensing line SL in accordance with the first switching signal SW1 of the turn-on level, the sixth switch TFT ST6 disconnects the sensing line SL from the ADC in accordance with the second switching signal SW2 of the turn-off level, and the seventh switch TFT ST7 connects the photo line PL to the buffer according to the third switching signal SW3 of the turn-on level.

In the display period, the display device sequentially writes the data voltages to the pixels PXL included in respective pixel lines from the first pixel line PL #1 to the last pixel line and makes the OLEDs emit light to display image data on the display panel 10. Also, in the display period, the display device performs the photo sense driving of accumulating light incident to the photo sensor into charges in the photo-capacitor CPT, controlling the switch of the photo sensor to apply the charges to the photo line PL, and outputting digital photo data PD by using the current flowing the photo line PL through the sensing unit and the ADC.

In FIG. 8, the gate driving circuit 13 sequentially outputs scan signals and sense signals to pixels of respective pixel lines from the first pixel line PL #1 to the last pixel line in the interval of one horizontal period 1H.

That is, in the first horizontal period, the gate driving circuit 13 applies the scan signal SCAN11 having the pulse width of 1H to the first gate line 15 of the first pixel line PL #1, then the first switch TFT ST1 is turned on and the data voltage of the data line DL is applied to the first node N1. Also, in the first horizontal period, the gate driving circuit 13 applies the sense signal SENS1 having a pulse width smaller than 1H to the second gate line 15 of the first pixel line PL #1, then the second switch TFT ST2 is turned on and the reference voltage Vref in the sensing line is applied to the second node N2. Since the OLED is initialized to the reference voltage Vref while the sense signal SENS1 of the turn-on level is applied, it is referred to as an initialization period.

If the scan signal SCAN11 maintains the turn-on level and the sense signal SENS1 changes to the turn-off level after the middle of the first horizontal period, a current corresponding to the gate-source voltage difference Vgs set in the initialization period flows through the driving TFT DT. And, the potential of the second node N2, which is the source electrode of the driving TFT DT, rises toward the data voltage applied to the first node N1, which is the gate electrode of the driving TFT DT, to program the gate-source voltage difference Vgs of the driving TFT DT to a desired gradation level. So, it is referred to as a sensing period.

When the scan signal SCAN11 is changed to the turn-off level in the second horizontal period, the potentials of the first node N1 and the second node N2 rise to the voltage level equal to or higher than the threshold voltage of the OLED and maintain their values, while maintaining the potential difference Vgs programmed in the sensing period. And, a driving current corresponding to the gate-source voltage difference Vgs of the driving TFT DT flows through the OLED, and as a result the OLED emits light to realize a desired gradation, which corresponds to a light emission period.

Similar to the pixels of the first pixel line PL #1, in the second horizontal period, the scan signal SCAN21 and the sense signal SENS2 as shown in FIG. 8 are applied to the pixels of the second pixel line PL #2. So, data voltages are applied to the pixels, the OLEDs are initialized and the gate-source voltage difference Vgs of the driving TFT DT is programmed. Then, in the third horizontal period, the pixels in the second pixel line emit light.

Meanwhile, the scan signal SCAN11 applied to the first gate line 15 of the first pixel line PL #1 is applied to the gate electrode of the third switch TFT ST3 of the photo sensor disposed in the first pixel line PL #1 in the first horizontal period. The scan signal applied to the first gate line 15 of the third pixel line PL #3 is applied to the gate electrode of the photo TFT PT of the photo sensor disposed in the first pixel line PL #1 in a third horizontal period.

So, the photo sensor disposed in the first pixel line PL #1 transfers the charges stored in the photo capacitor $C_{PT}$ through the photo line PL and the seventh switch TFT ST7 of the sensing unit to the buffer of the sensing unit, in the first horizontal period. The buffer integrates and amplifies it, and the ADC converts it into digital photo data PD and outputs it to the timing controller 11.

Similarly, the scan signal SCAN21 applied to the first gate line 15 of the second pixel line PL #2 is applied to the gate electrode of the third switch TFT ST3 of the photo sensor disposed in the second pixel line PL #2 in the second horizontal period, and the scan signal applied to the first gate line 15 of the fourth pixel line PL #4 is applied to the gate electrode of the photo TFT PT of the photo sensor disposed in the second pixel line PL #2 in a fourth horizontal period. So, the photo sensor disposed in the second pixel line PL #2 may output the digital photo data PD corresponding to the charges stored in the photo capacitor $C_{PT}$ in the second horizontal period.

When the scan signals to be applied to pixel lines are applied to the gate electrode of the third switch TFT ST3 and the gate electrode of the photo TFT PT of the photo sensor, it is possible to prevent the photo capacitor $C_{PT}$ from being connected to the photo line PL while the photo TFT PT is turned on and charges are accumulated in the photo capacitor $C_{PT}$, by applying two scan signals apart from each other by at least 1H to the third switch TFT ST3 and the photo TFT PT.

The order of the scan signals applied to the gate electrode of the third switch TFT ST3 and the gate electrode of the photo TFT PT of the photo sensor may be different from that of FIG. 8. A scan signal earlier than the scan signal applied to the gate electrode of the third switch TFT ST3 may be applied to the gate electrode of the photo TFT PT. That is, the scan signal SCAN11 applied to the first gate line 15 of the first pixel line PL #1 is applied to the gate electrode of the photo TFT PT of the photo sensor disposed in the first pixel line PL #1 in the first horizontal period, and the scan signal SCAN31 applied to the first gate line of the third pixel line PL #3 may be supplied to the gate electrode of the third switch TFT ST3 of the photo sensor disposed in the first pixel line PL #1 in the third horizontal period.

On the other hand, if one photo sensor is arranged for each 6×6 pixel unit group in a 4K display panel having a horizontal resolution of 3840 and a vertical resolution of 2160, 640 (3840/6) photo sensors in the horizontal direction and 360 (2160/6) photo sensors in the vertical direction may be arranged on the display panel.

If eight source drive ICs are mounted in the data driving circuit 12 and one ADC is arranged in each source drive IC, one ADC may process the photo sensing signals output from 80 (640/8) sensing units during 6 horizontal periods 6H. 1 horizontal period is about 1 s/60 frames/2160=7.4 us and 6H is 44.4 us.

Since the ADC operating at 4 MHz takes 0.25 us to process one sample and it takes 0.25 us×80=20 us to process 80 samples, there is no problem for the ADC to process 80 photo sensing signals during 6H.

As described above, by eliminating a separate reception drive IC for photo sensing and integrating it into a source drive IC for external compensating, drive ICs can be integrated to one IC and the number of ADCs can be reduced to save costs. Further, the size of the bezel may be reduced according to the integration of the drive IC.

Figure 9:
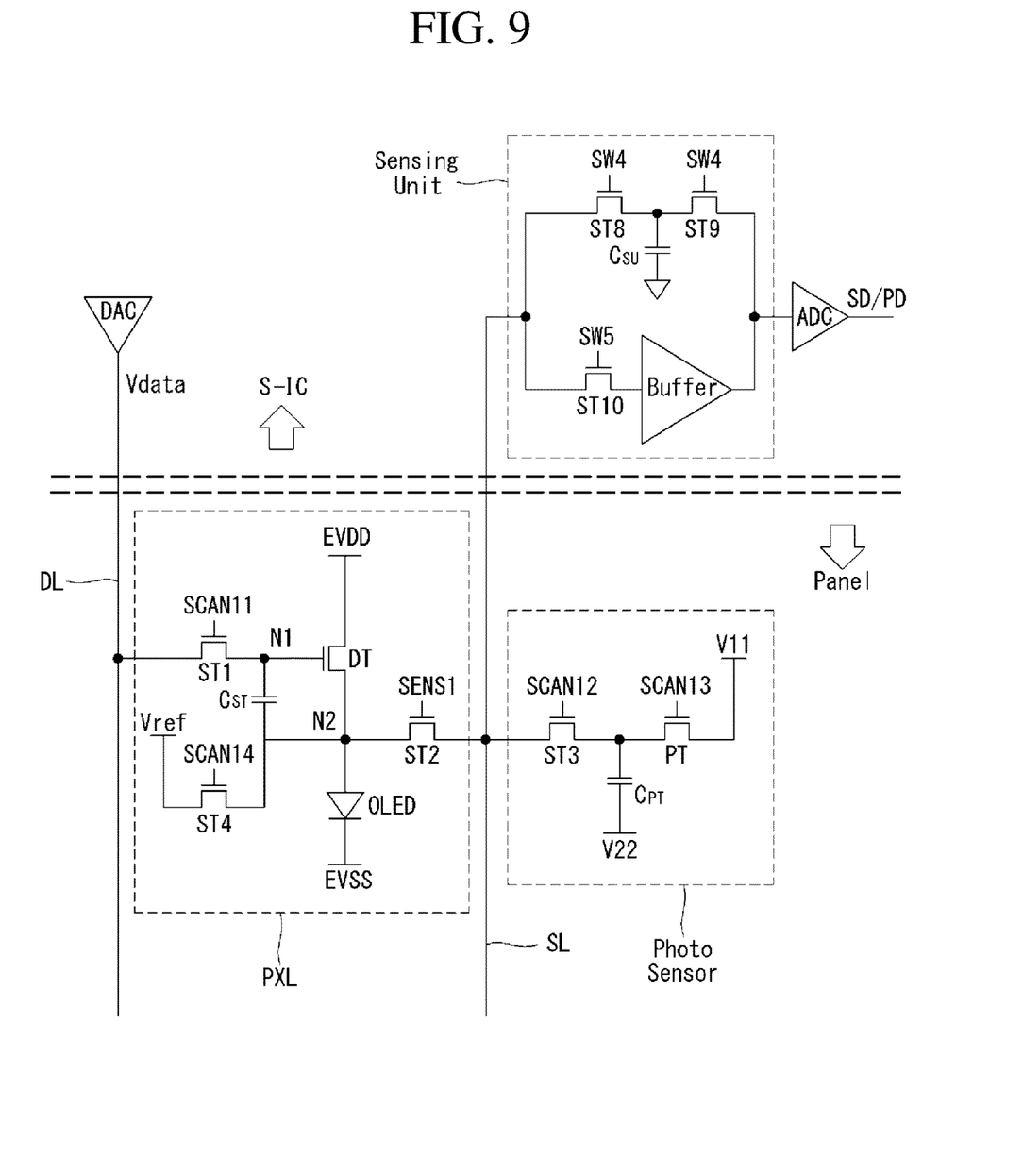
FIG. 9 illustrates that pixel circuits and photo sensing circuits mounted on the display panel are connected to a sensing unit incorporated in a source drive IC according to another aspect of the present disclosure.
Figure 10:
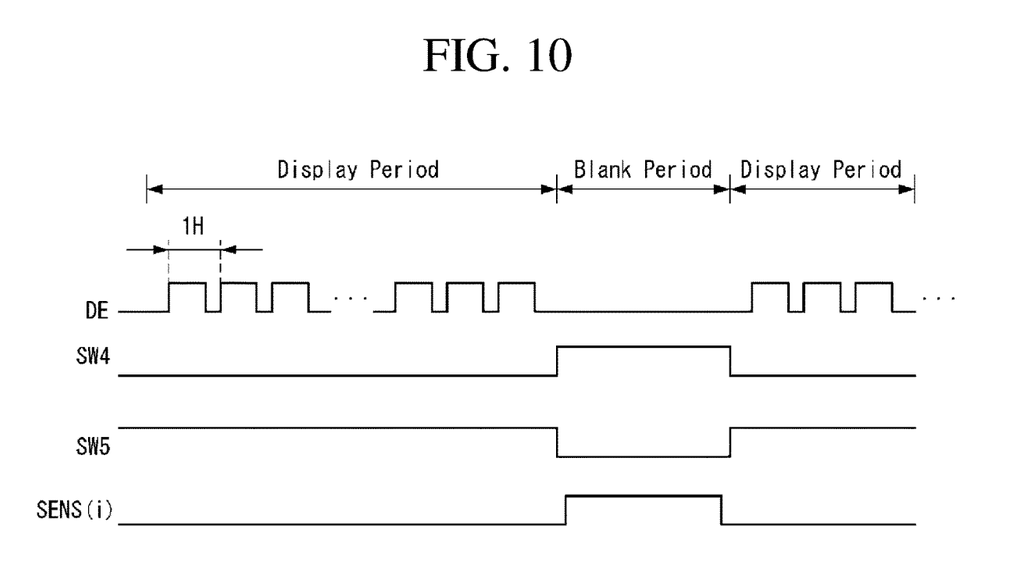
FIG. 10 shows operation timings of the switches constituting the sensing unit of FIG. 9.

FIG. 9 illustrates that pixel circuits and photo sensing circuits mounted on the display panel are connected to a sensing unit incorporated in a source drive IC according to another aspect of the present disclosure, and FIG. 10 shows operation timings of the switches constituting the sensing unit of FIG. 9.

In FIG. 9, the photo line PL of the photo sensor is omitted and the photo sensor is connected to the sensing line of the pixels. In the aspect of FIG. 6, in the display period, the reference voltage Vref is applied to the pixel from the sensing unit through the sensing line SL and the charges accumulated in the photo capacitor $C_{PT}$ of the photo sensor is transferred to the sensing unit through the photo line PL. Unlike FIG. 6, in the aspect of FIG. 9, the signal transmission through the sensing line SL may overlap in the display period, so that the reference voltage Vref must be supplied from the pixel in order to integrate the photo line PL and the sensing line SL.

To this end, the pixel circuit PXL further includes a fourth switch TFT ST4. A gate electrode of the fourth switch TFT ST4 is connected to the gate line 15 which outputs the scan signal SCAN14, a first electrode is connected to an input terminal of the reference voltage Vref and a second electrode is connected to the second node N2.

The sensing unit may include an eighth switch TFT ST8, a ninth switch TFT ST9, a tenth switch TFT ST10, a sensing unit capacitor $C_{SU}$, and a buffer.

The eighth switch TFT ST8 and the ninth switch TFT ST9 control the connection between the sensing line SL and the ADC. Gate electrodes of the eighth and ninth switch TFTs ST8 and ST9 receives a fourth switching signal SW4. A first electrode of the eighth switch TFT ST8 is connected to the sensing line SL and a second electrode of the eighth switch TFT ST8 is connected to a first electrode of the sensing unit capacitor $C_{SU}$. A first electrode of the ninth switch TFT ST9 is connected to the first electrode of the sensing unit capacitor $C_{SU}$ and a second electrode of the ninth switch TFT ST9 is connected to the ADC.

The sensing unit capacitor $C_{SU}$ serves to store the voltage of the second node N2 in the external compensation driving and serves as the sensing line capacitor $C_{SL}$ in the aspect of FIG. 6. The first electrode of the sensing unit capacitor $C_{SU}$ is connected to the second electrode of the eighth switch TFT ST8 and the first electrode of the ninth switch TFT ST9, and a second electrode of the sensing unit capacitor $C_{SU}$ is connected to the input terminal of supplying a predetermined voltage, for example a common voltage.

The tenth switch TFT ST10 controls the connection between the sensing line PL and the ADC. A gate electrode of the tenth switching TFT ST10 receives a fifth switching signal SW5. A first electrode is connected to the sensing line SL, and a second electrode is connected to the buffer.

The tenth switch TST ST10 and the buffer in FIG. 9 are same as the seventh switch TFT ST7 and the buffer in FIG. 6.

In FIG. 10, in the blank period, the eighth and ninth switch TFTs ST8 and ST9 connect the sensing line SL to the ADC according to the fourth switching signal SW4 of the turn-on level, and the tenth switch TFT ST10 disconnects the buffer from the sensing line SL according to the fifth switching signal SW5 of the turn-off level.

And, in the blank period, the sense signal SENS(i) of the turn-on level is applied to the second gate line 15 of the pixel line (for example, the i-th pixel line) to be subjected to external compensation driving, so the pixels of the corresponding pixel line is connected to the sensing line SL. However, in the display period, the sense signal SENS is applied at the turn-off level to all the pixel lines to disconnect the pixels from the sensing line SL.

The operations of the sensing unit of FIG. 9 are almost the same as those described for the sensing unit of FIG. 6, and a description thereof will be omitted.

The scan signal SCAN14 applied to the gate electrode of the fourth switch TFT ST4 is of the turn-off level in the blank period and is input as a same signal as the sense signal SENS1 of FIG. 8 in the display period. That is, the scan signal SCAN14 is input at the turn-on level at the beginning of the horizontal period in which the scan signal is input to a corresponding pixel line and is input at the turn-off level at the latter half of the horizontal period, which respectively correspond to an initialization period and a sensing period to the corresponding pixel line.

In the aspects of FIGS. 9 and 10, the display driving of emitting light by OLEDs of pixels and the photo sense driving of detecting a touch or pointer input in the photo sensor in the display period and the external compensation driving of sensing the driving characteristics of pixels in the blank period are same as those described with reference to FIGS. 6 to 8, and a description thereof will be omitted.

By omitting the photo line and integrating it into the sensing line as in the aspect of FIG. 9, it is possible to increase the aperture ratio of the pixel by reducing the number of wirings passing through the pixel.

Figure 11:
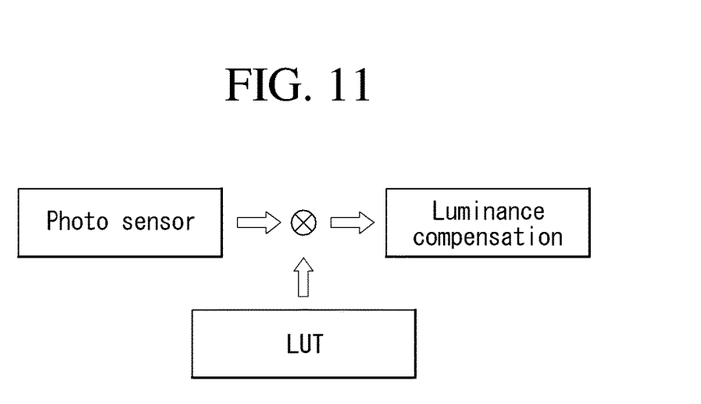
FIG. 11 conceptually illustrates another aspect of compensating the luminance of a pixel using the output of the photo sensing circuit.

FIG. 11 conceptually illustrates another aspect of compensating the luminance of a pixel using the output of the photo sensing circuit.

The aspects of FIGS. 6 to 10 correspond to the case of using a photo sensor to receive an external input. However, when the photo sensor is disposed for each pixel, if the photo sensor senses the light emitted by a corresponding pixel, it can be used to compensate for the luminance of the pixel.

In the structure in which the OLED light emitting layer and the TFT array are vertically stacked, since the light emitted from the OLED light emitting layer advances toward the TFT array as well as the surface of the display panel 10, the photo TFT of the photo sensor disposed in the TFT array may output an electric signal corresponding to the light emitted by a corresponding pixel.

Even in the structure in which the OLED light emitting layer and the TFT array are horizontally arranged, the light emitted from the OLED light emitting layer can travel in the horizontal direction across the bank to enter the photo sensor. A coating process may be performed on a bank at a cell boundary so that light emitted from neighboring pixels does not enter the photo sensor.

The photo sensor must store charges in a capacitor using light incident during a period during which the corresponding pixel emits light or during a portion of the period during which the corresponding pixel emits light. Therefore, in the photo sensor of FIG. 6 or FIG. 9, a signal of a turn-on level must be applied to the gate electrode of the photo TFT PT while the corresponding pixel emits light.

In FIG. 8, the pixels arranged in the first pixel line PL #1 are initialized and sampled in a first horizontal period and emit light from a second horizontal period. Thus, the photo TFT PT of the photo sensor disposed in the first pixel line PL #1 must operate after the second horizontal period, and a scan signal SCAN21 applied to the first gate line 15 of the second pixel line PL #2 or a scan signal SCAN31 applied to the first gate line 15 of the third pixel line PL #3 may be applied to the gate electrode of the photo TFT PT.

The third switch TFT ST3 of the photo sensor for applying the charges accumulated in the photo capacitor $C_{PT}$ to the photo line PL must operate after the time when the photo TFT PT operates. However, since it is difficult to secure the time for the third switch TFT ST3 of the photo sensor to operate in the case of the photo sensor of a last pixel line, it is advantageous that the third switch TFT ST3 applies the charges accumulated in the photo capacitor $C_{PT}$ to the photo line PL in a next frame other than the frame in which the photo TFT PT operates.

Further, drawing out a scan signal from a pixel line distant from the pixel line in which the photo sensor is disposed may also cause a complication of the pixel wiring structure, thereby lowering the aperture ratio.

Accordingly, as shown in FIG. 8, in the first pixel line PL #1, the third switch TFT ST3 controlled by the scan signal SCAN12 may transfer, to the photo line PL, the charges stored in the photo capacitor $C_{PT}$ by the emission (the emission is occurred by using the scan signal SCAN11 applied to the same pixel line PL #1 in a previous frame) of a corresponding pixel disposed in the first pixel line. And, the photo TFT PT may use the scan signal SCAN31 applied after two horizontal periods (or applied to a pixel line below two pixel lines) as the scan signal SCAN13, to convert light energy emitted by a corresponding pixel disposed in the first pixel line in a current frame into electrical energy and to accumulate charges in the photo capacitor $C_{PT}$.

The timing controller 11 may manage a look-up table LUT that stores the correlation between luminance and image data for a predetermined number of gray scales, and may manage, in the look-up table, the luminance in the form of the digital photo data SD output from the photo sensor. The timing controller 11 may compare the image data written to a pixel and the digital image data PD which the photo sensor detected for the light which the pixel emits with the image data, with the value stored in the look-up table LUT, determine a change in the characteristics of the pixel according to the comparison, and change the image data to be applied to the pixel so as to compensate for the driving characteristics of the pixel.

As described above, it is possible to compensate for the change in the light emission characteristics of the pixel based on the luminance actually detected by the photo sensor.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

What is claimed is:

1. A display device, comprising:
    a plurality of pixels emitting light according to an image signal and a plurality of photo sensors outputting an electrical signal responding to incident light that are included in a display panel;
    a data driving circuit including one or more source drive IC configured to supply the image signal to the plurality of pixels, receive a sensing signal indicating characteristics of the plurality of pixels, and receive the electrical signal from the plurality of photosensors;
    a gate driving circuit configured to generate scan signals to control operations of the plurality of pixels and the plurality of photosensors; and
    a timing controller configured to supply control signals to control operations of the data driving circuit and the gate driving circuit and image data to be displayed in the display panel,
    wherein the one or more source drive IC includes:
    a digital-to-analog converter DAC configured to convert the image data supplied from the timing controller into the image signal;
    one or more sensing units configured to receive the electrical signal from the photo sensors in a display period during which the image signal is supplied to the plurality of pixels and to receive the sensing signal from the pixel in a blank period between two display periods; and
    an analog-to-digital converter ADC configured to convert a signal output from the sensing unit into digital data,
    wherein the scan signals controlling operations of the plurality of pixels and the plurality of photosensors comprise a first scan signal which applies a data voltage corresponding to the image signal to the pixel and simultaneously transmits the electrical signal stored in the photosensors.

2. The display device of claim 1, wherein the plurality of pixels include:
    a light emitting diode emitting light according to an applied current;
    a driving TFT controlling an amount of the current applied to the light emitting diode according to a voltage difference between gate and source electrodes;
    a first switch TFT supplying the image signal supplied by the data driving circuit to the gate electrode of the driving TFT responding to the scan signal;
    a second switch TFT controlling a connection to the sensing unit responding to the scan signal; and
    a storage capacitor storing a data voltage corresponding to the image signal supplied to the driving TFT.

3. The display device of claim 1, wherein the plurality of pixels is connected to the sensing unit through a sensing line, and the plurality of photo sensors are connected to the sensing unit through a photo line.

4. The display device of claim 3, wherein the sensing unit includes:
    a fifth switch TFT controlling whether a reference voltage is supplied to the pixel through the sensing line;
    a sixth switch TFT controlling a connection between the sensing line and the ADC;
    a seventh switch TFT controlling a connection between the photo line and the ADC; and
    a buffer amplifying the electrical signal input through the photo line and transferring the amplified electrical signal to the ADC.

5. The display device of claim 4, wherein the fifth and seventh switch TFTs are turned on in the display period, and the sixth switch TFT is turned on in the blank period.

6. The display device of claim 1, wherein the plurality of pixels and the plurality of photo sensors are connected to the sensing unit through a sensing line, and the plurality of pixels further include a switch TFT for controlling a timing of supplying a reference voltage.

7. The display device of claim 6, wherein the sensing unit includes:
    eighth and ninth switch TFTs controlling a connection between the ADC and the sensing line according to a same control signal in the blank period;
    a sensing unit capacitor disposed between the eighth and ninth switch TFTs and storing a voltage corresponding to the sensing signal;

a tenth switch TFT controlling a connection between the sensing line and the ADC in the display period; and a buffer amplifying the electrical signal input through the sensing line in the display period and transferring the amplified electrical signal to the ADC.

8. The display device of claim 1, wherein the plurality of pixels and the sensing unit are connected through a sensing line, and wherein the gate driving circuit is configured to supply a sense signal of a turn-on level to a first pixel to which the data driving circuit supplies the image signal in order to connect the first pixel to the sensing line in the display period, and supply the sense signal of the turn-on level a second pixel to which the data driving circuit supplies image signal for sensing in order to connect the second pixel to the sensing line in the in the blank period.

9. The display device of claim 1, wherein the plurality of photosensors include:

a photo TFT outputting a current corresponding to incident light;

a photo capacitor charging the current output by the photo TFT; and a third switch TFT controlling a connection between the photo capacitor and the sensing unit according to the scan signal.

10. The display device of claim 9, wherein the photo TFT and the third switch TFT are turned on by two scan signals apart from each other by at least 1 horizontal period.

11. The display device of claim 10, wherein the third switch TFT of the plurality of photo sensors is controlled by a first scan signal, the first scan signal being supplied to a pixel corresponding to the photo sensor so as to supply the image signal to the corresponding pixel, and the photo TFT of the photo sensor is controlled by a second scan signal that is at least two horizontal periods later than the first scan signal.

12. The display device of claim 1, wherein the plurality of photo sensors output, to the sensing unit, the electrical signal corresponding to light which a pixel corresponding to the photo sensor emits according to the image signal, and the ADC converts the electrical signal into digital photo data.

13. The display device of claim 12, wherein the timing controller is configured to manage a look-up table storing correlation between the image data and luminance which the pixel emits, compare the digital photo data transferred from the data driving circuit with corresponding data in the look-up table, and compensate for image data to be displayed on the display panel according to comparison results.

14. The display device of claim 1, wherein the ADC converts the electrical signal output by the plurality of photosensors into digital photo data and output it, and wherein the timing controller is configured to compare the digital photo data transferred from the data driving circuit with a reference value, generate a coordinate of the photo sensor outputting the digital photo data exceeding the reference value, and transmit the coordinate to a connected host system.

15. The display device of claim 14, wherein the host system is configured to generate an image expressing that there is an external input in the coordinate received from the timing controller, superimpose the generated image on the image data to be displayed on the display panel, and output the superimposed image data to the timing controller.

16. The display device of claim 1, wherein one photosensor is disposed for each pixel unit constituted by a plurality of pixels.

17. A display device, comprising:

a plurality of pixels disposed at a display panel emitting light according to an image signal;

a plurality of photo sensors disposed at the display panel and outputting an electrical signal responding to incident light;

a source drive IC configured to supply the image signal to the plurality of pixels, receive a sensing signal indicating characteristics of the plurality of pixels, and receive the electrical signal from the plurality of photo sensors, wherein the source drive IC includes:

a digital-to-analog converter DAC configured to convert the image data supplied from a timing controller into the image signal, a sensing unit configured to receive the electrical signal from the photo sensors during a display period during which the image signal is supplied to the pixel and to receive the sensing signal from the pixel in a blank period between two display periods, an analog-to-digital converter ADC configured to convert a signal output from the sensing unit into digital data, wherein the plurality of photo sensors and the plurality of pixels are connected to the source drive IC through a sensing line; and a gate driving circuit configured to generate scan signals to control operations of the plurality of pixels and the plurality of photo sensors, wherein the scan signals controlling operations of the plurality of pixels and the plurality of photosensors comprise a first scan signal which applies a data voltage corresponding to the image signal to the pixel and simultaneously transmits the electrical signal stored in the photo sensors.

18. The display device of claim 17, further comprising a timing controller supplying control signals to control operations of the data driving circuit and the gate driving circuit and image data to be displayed, wherein the timing controller is configured to compare digital photo data transferred from the source drive IC with a reference value, generate a coordinate of the photo sensor outputting the digital photo data exceeding the reference value, and transmit the coordinate to a connected host system.

* * * * *